United States Patent [19]

Mahin et al.

[11] Patent Number: 5,702,109
[45] Date of Patent: Dec. 30, 1997

[54] EXPANDABLE HIGH-PRESSURE FLEXIBLE-TUBE DEVICE

[75] Inventors: Daniel Mahin, Savonnieres; Philippe Blin, Monts, both of France

[73] Assignee: Hutchinson, France

[21] Appl. No.: 571,902

[22] PCT Filed: Jun. 17, 1994

[86] PCT No.: PCT/FR94/00732

§ 371 Date: Dec. 13, 1995

§ 102(e) Date: Dec. 13, 1995

[87] PCT Pub. No.: WO95/00738

PCT Pub. Date: Jan. 5, 1995

[30] Foreign Application Priority Data

Jun. 17, 1993 [FR] France ................ 93 07317

[51] Int. Cl.⁶ ............................................. F16J 15/46
[52] U.S. Cl. ................................. 277/34; 166/187
[58] Field of Search ............. 277/34, 34.3, 34.6, 277/230; 166/187; 138/93, 109

[56] References Cited

U.S. PATENT DOCUMENTS

| | | | |
|---|---|---|---|
| 2,643,722 | 6/1953 | Lynes et al. | |
| 3,542,127 | 11/1970 | Malone | 166/122 |
| 4,311,314 | 1/1982 | Suman | 277/34 |
| 4,514,447 | 4/1985 | Boxmeyer | 428/36 |
| 5,183,108 | 2/1993 | Lee, Jr. et al. | 277/9 |
| 5,205,567 | 4/1993 | Quinlan et al. | 277/34 |
| 5,236,201 | 8/1993 | Vance, Sr. et al. | 277/34 |

FOREIGN PATENT DOCUMENTS

| | | |
|---|---|---|
| 2081395 | 4/1993 | Canada . |
| 0 264 973 | 3/1983 | European Pat. Off. . |
| 1561771 | 4/1968 | France . |
| 2 099 541 | 5/1982 | United Kingdom . |

*Primary Examiner*—Scott Cummings
*Attorney, Agent, or Firm*—Cabinet Ores

[57] ABSTRACT

An expandable high-pressure flexible tube device for sealing piping in gas or oil fields. The device comprises two end pieces interconnected by a tubular element having an elastomeric material and sheets of coils round about its longitudinal axis at a small angle of about 10° to 15° relative thereto. The sheets comprise strong helical textile cords mutually separated by a predetermined spacing. A sheet having longitudinal textile cords extends over the whole length of the device, the helical cords and longitudinal cords being imbedded in the elastomeric material.

8 Claims, 4 Drawing Sheets

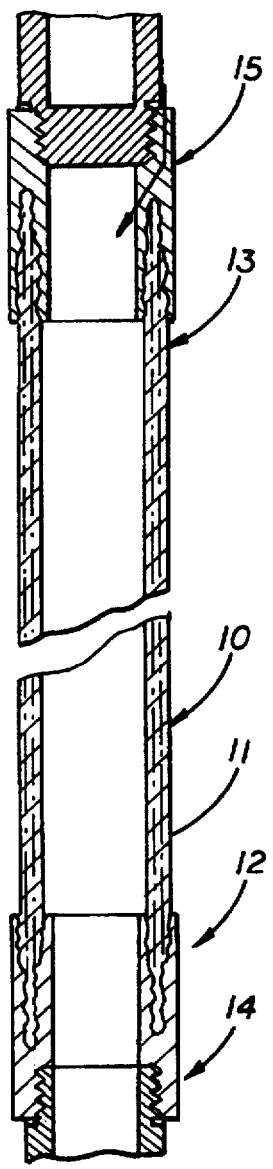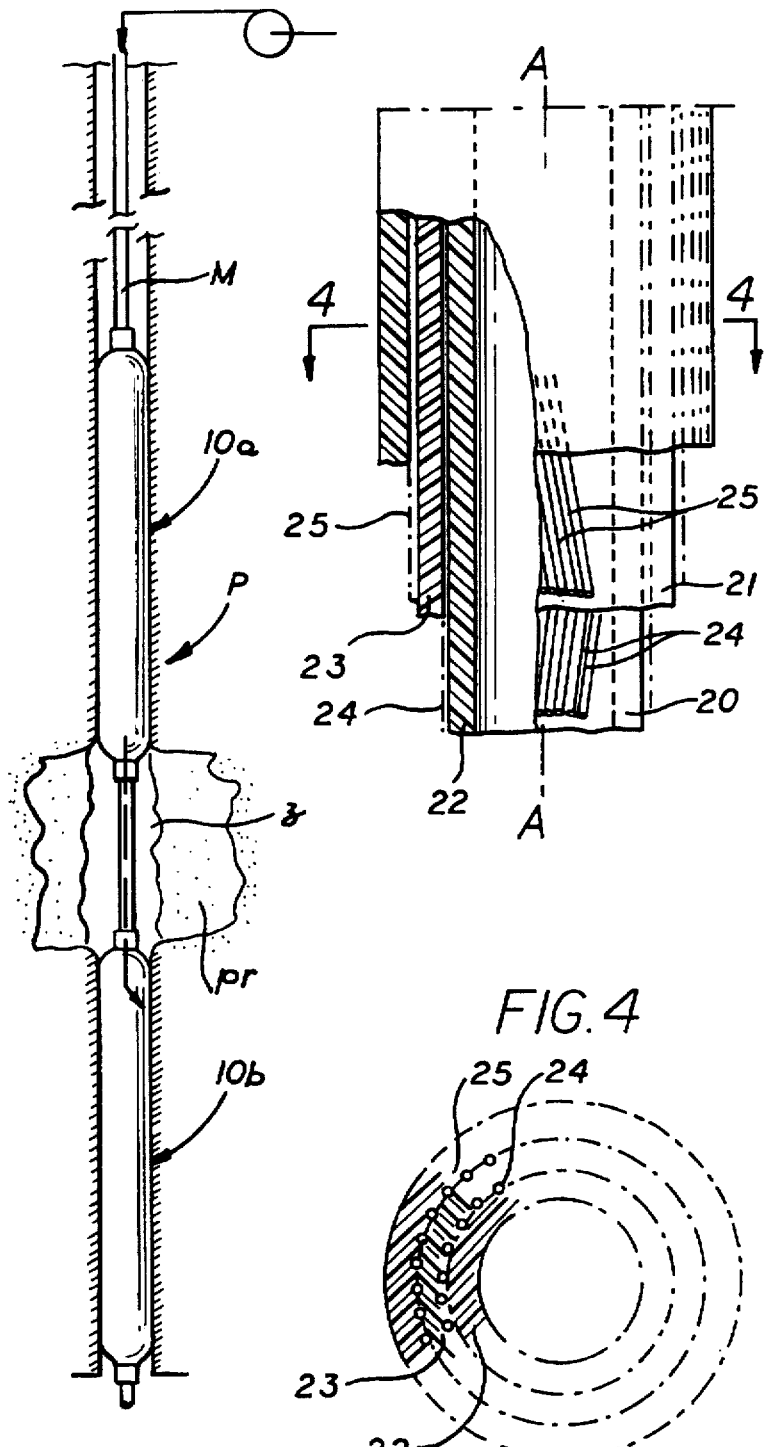

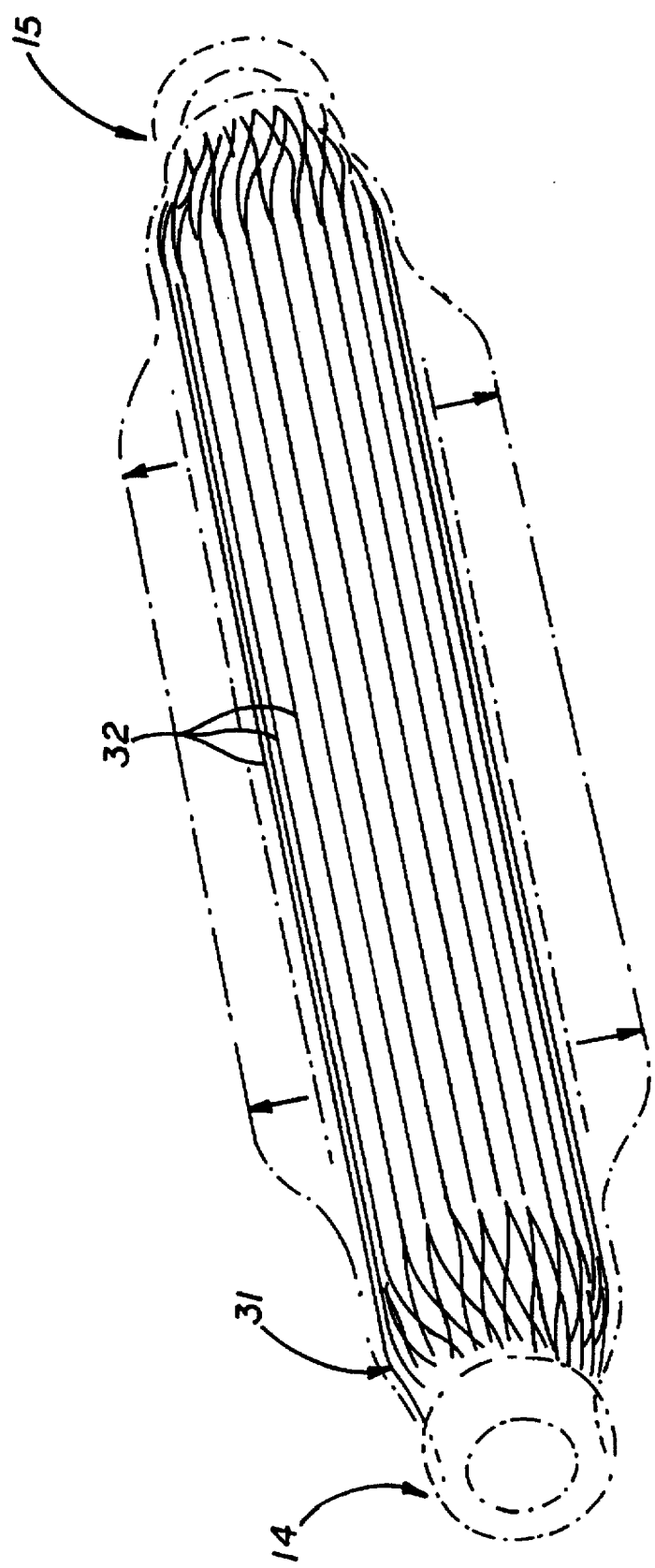

EXPANDABLE HIGH-PRESSURE FLEXIBLE-TUBE DEVICE

The invention concerns an expandable high-pressure flexible-tube device, in particular for use in working underground wells, especially oil and gas wells. It is also suitable for use in other areas such as geological work or mining.

In gas or oil wells, this type of device is normally used to seal well piping and is thus termed a "packer", which may be inflatable or expandable. In mining, these devices are normally known as expandable tubes. Whatever the terminology used, this type of device comprises a deformable tubular membrane comprising an elastomeric matrix strengthened by reinforcements, the two ends of which membrane are solid with end pieces which mount the device on a mandrel for insertion into the well or hole. These devices, which are also suitable for use in consolidating ground by injection of cement, for measuring permeability by injecting water, for hydrogeological prospecting installations, etc . . . , are known in a number of embodiments, as shown, for example, in "New Generation Inflatable Packing Elements" by R. K. Mody and M. P. Coronado, presented at the "Offshore Technology Conference", Houston, Tex., May 6–9, 1991, or in French patents FR-A-2 625 254, FR-A-2 582 077, FR-A-2 523 206, or U.S. Pat. Nos. 3,581,816, 5,101,908, 5,109,926, etc . . . .

When flexible-tube devices of the type described above are used in working oil or gas fields, a non limiting example being for stimulation, they are subjected to extremely severe operating conditions as regards temperature, pressure, chemical environment and mechanical stress. Regarding the latter, specifications sometimes require that the tubular element composed of elastomeric material must be able to expand to three times its outside diameter and contract again reversibly (for example, from an initial diameter of 52 millimeters (mm) to a final diameter of 162 mm and vice versa) and must resist a working pressure which can be of the order of at least 100 bars, this value corresponding to that necessary for pressing the tubular element against the inside face of the piping and to the differential counterpressures exercised on parts of the device when in this condition. The majority of known devices with a deformable elastomeric annular element—including those provided with reinforcing members—cannot completely satisfy the conditions encountered in actual working and, as indicated in the conference article cited above or in FR-A 2 625 254, the expandable tubular element must be combined with metal reinforcements at its ends. These must be very carefully designed, greatly increasing the cost of the device, and they are sometimes subject to operational malfunctions when the device returns to its unexpanded condition, meaning that the device cannot be used again.

The problem is thus to provide an expandable high-pressure flexible-tube device which does not have the problems of known devices. In general, then, one aim of the invention is to provide such a device.

A further aim of the invention is to provide such a device which, in contrast to the majority of known devices, can be reliably reused a number of times.

A still further aim of the invention is to provide such a device which can seal as efficiently as known devices and in particular which presses strongly, when expanded, against the wall of the borehole or casing which is to be sealed, despite the extremely high stresses (which can be of the order of several metric tons) which occur in the zones where the tubular element is connected to the end connectors when the outside diameter of the tubular element is multiplied by three.

A yet still further aim of the invention is to provide such a device which is suitable for working gas and/or oil fields where operating conditions comprise cycles of inflation for a short period, maintenance under pressure for several hours and deflation, with the deformable portion returning—to within only a few percent—to its initial diameter.

It is known that, in order to allow the deformable portion to expand, the reinforcing members it contains must be set at a very small angle to the longitudinal axis, of the order of 10° to 15°, and in several sheets separated by intermediate sheets of elastomeric material. However, that measure alone does not produce satisfactory results. The prior art thus describes, for example in GB-A-2 099 541 or EP-A2-0 264 973, supplementary reinforcement means constituted by a plurality of helical windings of cords, i.e. a quantitative increase in the number of reinforcing members whose fundamental nature is not altered. However, when that type of device is used, the multiplication in the number of reinforcing members in the deformable annular element does not increase performance greatly and does not solve the problem, since the annular element always takes the shape of a "long bone", i.e. with the ends bulging out to a greater diameter than the middle portion. The greater degree of inflation in these end zones results in premature bursting in these zones.

The invention provides an expandable high-pressure flexible-tube device, in particular for sealing piping in gas or oil fields, comprising two end pieces and a tubular element composed of elastomeric material comprising at least two sheets of cords wound in a helix about the longitudinal axis of said element, at a small angle of about 10° to 15° relative to said axis, the sheets being crossed relative to said axis, characterized in that each sheet is stranded and comprises, in the warp direction, very strong textile cords, in particular composed of aramid fibers, mutually separated by a predetermined spacing, and which are embedded in said elastomeric material by being strongly bonded thereto, the device also comprising at least one sheet of longitudinal cords which extend over the whole length of the device and which are embedded in the elastomeric material of said element by being strongly bonded to said material.

According to a further feature of the invention, the stranded sheets forming the reinforcing members of the expandable tubular element composed of elastomeric material comprises, in the warp direction, very strong textile cords, advantageously composed of aramid fibers such as Kevlar (a trade mark of Dupont de Nemours) wherein each cord is completely covered with said elastomeric material and rendered highly adherent thereto, adjacent cords not being in contact with one another.

In a further feature of the invention, the spacing of adjacent cords is predetermined and is held at a substantially constant value during manufacture of the device, for example using positioning means such as metal combs or analogous means.

The use of textile cords, in particular composed of aramid fibers whose thermal conductivity is far lower than that of steel, also means that the device of the invention (in which the weight of the cords is substantial) has a higher thermal insulating power than that of known devices and thus a lower operating temperature in the device interior, meaning an increase in its lifetime.

In a device of the invention, in which the reinforcing members of the tubular element are yarns or cords in stranded sheets—pressure sheets—, inflation of the tubular element causes the yarns or cables to move further apart by elongation of the elastomeric material between two adjacent yarns or cords, along with a small angular deviation of the yarns or cords from the initial positioning of about 10° to 15° in the unstressed state of the device, inflation occurring at a lower pressure than with known prior art devices.

According to a further feature of the invention, the sheet of longitudinal cords is stranded and the longitudinal cords are spaced apart by a predetermined distance.

Further, the sheet or sheets of longitudinal cords may be close to the outer periphery of the tubular element, and/or close to the inner periphery, and/or between two pairs of crossed cord sheets, and/or between crossed cord sheets.

In an embodiment of the device, each sheet is composed of 3300/1/3 dtex aramid fibers (i.e. cords containing three twisted yarns, each monofilament yarn having a numbering of 3300dtex) treated by rolling or coating with an adherence-producing substance composed of polychloroprene, for example.

With this type of structure, and in contrast to known devices, the cords do not stretch, meaning that they can return to their initial position after deflation, encouraging a return by the device to its initial diameter.

In a variation of the invention, in order to reduce the stress close to the ends of the expandable tubular element, the stranded pressure sheets are conformed such that the angle of the yarns or cords constituting these sheets is different in said end zones to that in the middle zone of the tubular element.

In one embodiment, the laying angle for the yarns or cords constituting the pressure sheets is of the order of 10°–12° in the middle zone, where the element has to expand by up to three times its initial diameter, and is of the order of 20° in the end zones.

In a further variation of the invention, stress close to the end zones is limited by attaching sleeves with reinforced borders to these zones, which sleeves, after positioning, are turned back then fixed with longitudinal ties.

In a still further variation of the invention, a winding of radially deformable fabric is used to reduce stress in the end zones of the device.

Further characteristics and advantages of the invention become apparent from the following description made with reference to the accompanying drawings, in which:

FIG. 1 is a highly schematic view of a device of the invention;

FIG. 2 shows two devices of the invention in the expanded state as they would used in an operation of stimulating an oil well;

FIG. 3 is a partially cut-away view of the basic structure of a deformable annular element of a device in accordance with the invention;

FIG. 4 is a section along line 4—4 in FIG. 3;

FIG. 5 is a highly diagrammatic perspective view of a device in accordance with the invention;

Figure 6:
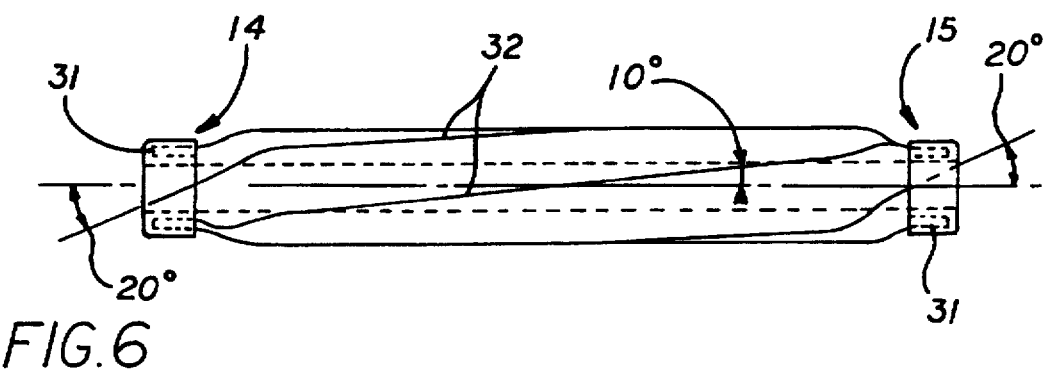
FIG. 6 is a highly diagrammatic view of a further embodiment of the invention illustrating an advantageous disposition of the yarns or cords of a reinforced pressure sheet, in the rest position.

Referring firstly to highly diagrammatic FIGS. 1 and 2 which respectively show an expandable high-pressure flexible-tube device and an example of the use of such a flexible-tube device in working oil fields. The expandable high-pressure flexible-tube device or "packer" 10 comprises an expandable tubular element or membrane 11 composed of an elastomeric material, fixed at its two ends 12 and 13 to respective end pieces 14 and 15. These end pieces are advantageously as described in our European patent EP-A1-0 516 515, however this is not limiting in any way.

When such devices or packers are used for stimulation in an oil well, two devices 10a and 10b with an outside diameter in the unexpanded state which, in one embodiment, may be about 54 mm, are mounted on a mandrel M, are lowered through production tubing of slightly larger diameter, and are placed on either side of a production zone pr of well P. Devices 10a and 10b are then expanded to isolate a zone z into which acid sludge is injected to stimulate the production zone, using suitable means which are not shown. The diameter of the well or its casing is, in some cases, of the order of 162 mm, so that in order to obtain a satisfactory seal, membrane 11 must be expanded to about three times its initial diameter. It must also be able to withstand high pressures of the order of at least 100 bars, i.e. an inflation pressure of the order of 30–40 bars which presses the membrane against the casing, and differential counterpressures exercised on different parts of the membrane which can be of the order of 60 bars or more, all in a difficult environment (working temperature in the range 20° C. to 120° C., humidity which can vary from 0% to 100% between storage and use, and the presence of heavy hydrocarbons and chemical substances which are acidic and corrosive).

In order to produce an expandable high-pressure flexible-tube device which can be used under these conditions, according to the invention membrane 11 (fixed at its ends to end pieces 14 and 15, the first of which is movably mounted in known fashion on mandrel M) is constituted by a matrix of elastomeric material(s), advantageously a mixture of rubbers with excellent remanence when highly stretched and which has the required characteristics of mechanical strength and resistance to chemical substances. At least two sets of reinforcing "pressure" members are embedded in a matrix of this type which may, for example, be of polychloroprene. According to the invention, the reinforcing members are in the form of stranded sheets of textile yarns or cords, advantageously composed of aramid fibers such as Kevlar (trade mark of Du Pont de Nemours). As shown in FIG. 3, at least two crossed sheets 20 and 21 are present, the first mounted on an inner tube 22 and the second mounted on the first with an intermediate sheet 23 between them, for example but not necessarily of the same elastomeric material as that of inner tube 22; the two sheets 20, 21—which are crossed relative to the longitudinal axis A of the membrane—are each constituted by yarns or cords 24 for sheet 20 and 25 for sheet 21, each completely covered with elastomeric material and laid at an angle α of the order of 10° to 15° to axis A. Cords 24 and 25, which adhere strongly to the elastomeric material in which they are embedded, have a Young's modulus which is higher than that of the material and they are disposed in a fashion analogous to warp yarns in a woven fabric, being held during positioning at a substantially constant predetermined mutual spacing, for example by means of metal positioning combs. With this structure for the pressure sheets, inflation of membrane 11 is easy and immediate even at low pressures, its diameter passing from its initial condition with diameter d to a value of about 3d at a pressure of between 30 and 60 bars. Further, the cords remain properly in position and return to their initial position after deflation, without stretching.

Figure 7:
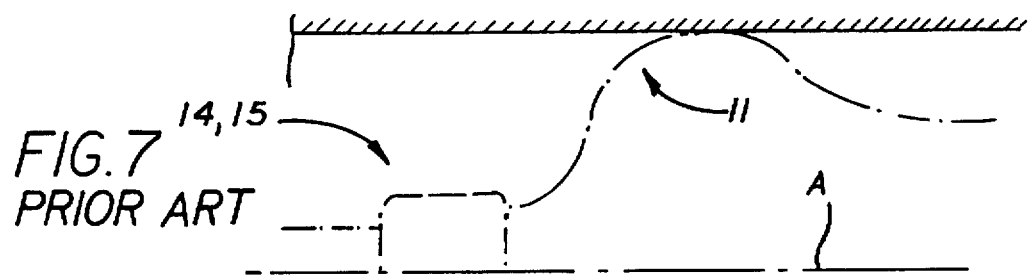
FIG. 7 is a diagrammatic view illustrating the deformation of an annular element in a known device.
Figure 8:
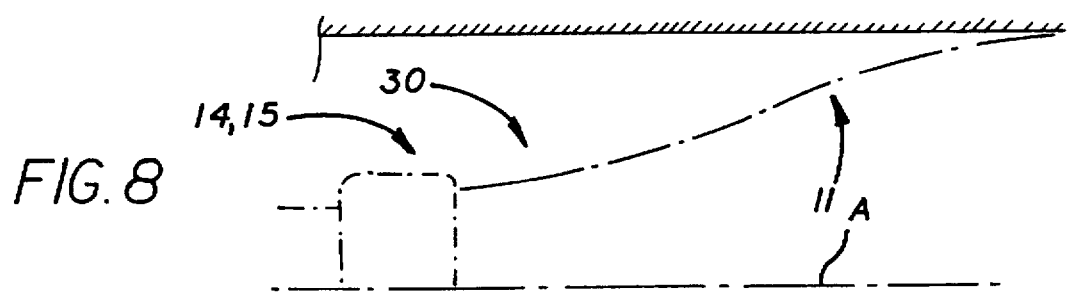
FIG. 8 is an analogous view to FIG. 7, for a device in accordance with the invention.

When this structure is combined with means which limit the stress occurring close to the ends during inflation, then in the end zones and in its inflated condition membrane 11 has a shape close to that shown in FIG. 8, i.e. with a portion 30 in which the cross-section through a longitudinal plane is regular from the end pieces 14, 15 up to the expanded portion of the membrane. In prior art devices without the means of the invention, however, the shape of the membrane after inflation is that of a "long bone", FIG. 7, where the ends have a larger diameter than the central portion.

Figure 9:
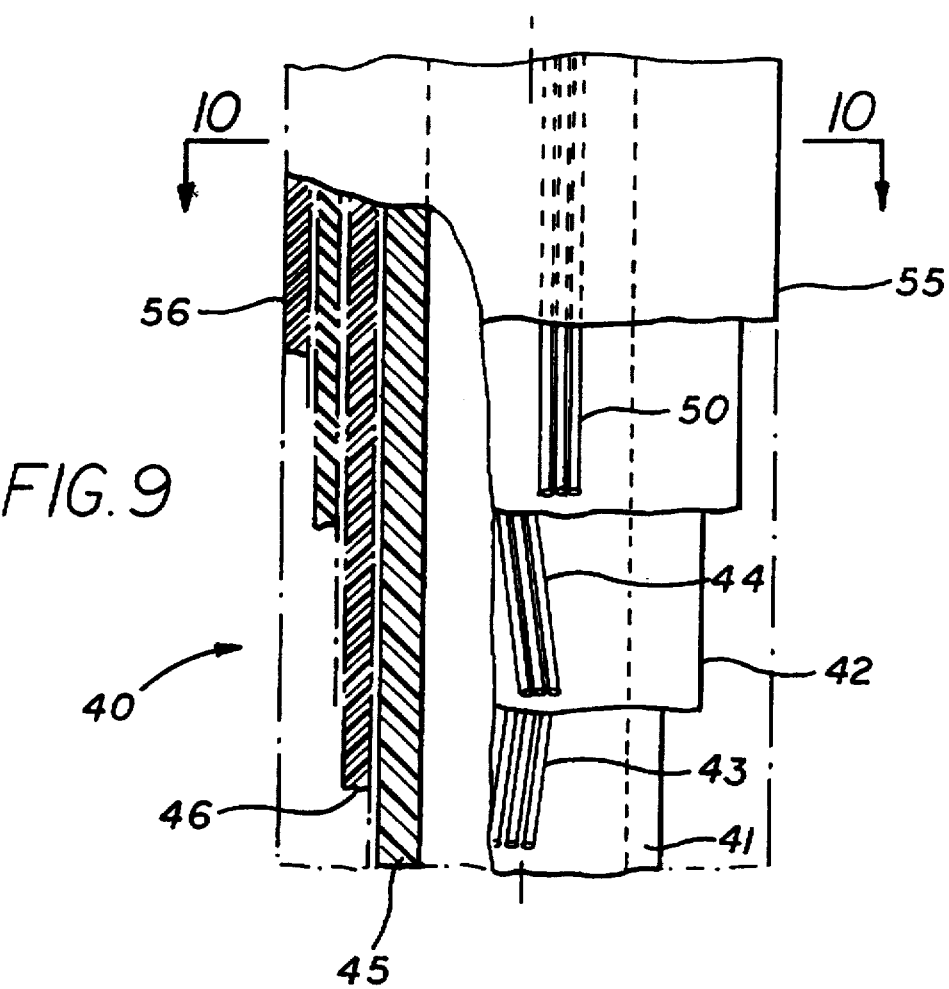
FIG. 9 is a view analogous to FIG. 3 but for a preferred embodiment of the invention.
Figure 10:
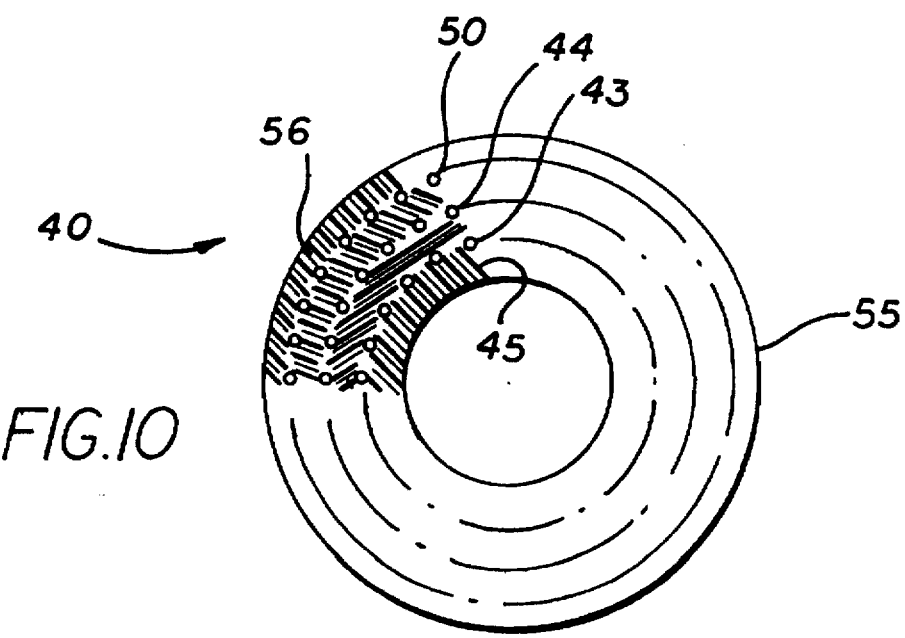
FIG. 10 is a section along line 10—10 in FIG. 9.

The means which limit the stress in the connection zones at the end pieces in the tubular element of the device in the inflated state are constituted, in a preferred embodiment of the invention and as shown in FIGS. 9 and 10, by at least one stranded keeper sheet whose longitudinal yarns or cords 50 extend along substantially the entire length of the device and which are embedded in the elastomeric material constituting membrane 40 to which they are strongly bonded, as are the other yarns or cords 43 and 44 of pressure sheets 41 and 42, laid at a angle of the order of 10° to 15° relative to the longitudinal axis of the membrane, the first on a central tube 45 of elastomeric material and the second on an intermediate sheet 46, for example but not necessarily of the same material, the two sheets being crossed relative to longitudinal axis A.

This structure for membrane 40, where longitudinal reinforcements 50 are, for example, located close to the periphery 55 of the membrane constituted by an elastomeric material tube 56, produces a "packer" which satisfies specifications for use.

Some longitudinal cords 50 can also be provided close to the inside surface of the element, and/or between pairs of crossed cord sheets, such as the pair of sheets 41, 42, or even between two crossed sheets 41, 42.

In a variation of the invention, in order to reduce the stress occurring on inflation of the expandable tubular element, in particular close to its ends, cords of reinforcing members of pressure sheets can be positioned as shown in FIG. 6, i.e. such that they form—in their initial laying position—a varying angle with axis A of the membrane, for example of the order of 10°–12° in the middle zone and of the order of 20° close to the ends which are provided with end pieces 14 and 15. With this structure, which can be produced by holding the cords captive in strips of elastomeric material of varying width and then winding these strips appropriately, the deformation observed close to the ends of the membrane after inflation exhibits a regular transition between the expanded membrane of the end pieces 14 and 15, where the diameter remains that of the membrane in its initial state.

The stress which each sheet needs to withstand can be further reduced by providing more than two stranded sheets and by adjusting the ratio between the density of the reinforcing cords to the quantity of elastomeric material in which they are embedded.

In a further embodiment, which is not illustrated, a winding of radially deformable fabric is positioned in each end zone of the device.

In a still further embodiment of the invention, shown in FIGS. 5 and 6, sleeves 31 are mounted near the connections of the ends of membrane 11 to end pieces 14 and 15, which sleeves advantageously have reinforced borders which, after positioning, are turned back then fixed by longitudinal ties 32.

EXAMPLE

A membrane 40 of a device of the invention was produced from an inner polychloroprene tube with an inside diameter of 26 mm and a thickness of 4 mm on which a first stranded sheet reinforced with 3300/1/3 dtex aramid was mounted. A 2.4 mm thick intermediate sheet was mounted on this sheet and was in turn covered with a second stranded sheet reinforced with 3300/1/3 dtex aramid. A further intermediate sheet was deposited over this second sheet and was in turn covered with a third stranded sheet reinforced with 72 cords of 3300/1/3 dtex aramid, which was in turn covered with a tubular coating with an outside diameter of 53 mm.

Tests conducted with this "packer" achieved an inflation of 3 diameters at a pressure of the order of 50 bars, the rupture pressure obtained being more than 100 bars in a 152 mm casing.

We claim:

1. An expandable high-pressure flexible device for sealing piping in gas or oil fields, the device comprising two end pieces and a tubular element interconnecting said end pieces, said tubular element having a longitudinal axis and comprising an elastomeric material and sheets of cords which are wound about said longitudinal axis at a small angle of about 10° to 15° relative to said axis and which are crossed relative to said axis, said sheets comprising strong helically wound textile cords which are mutually separated by a predetermined spacing, the said device further comprising at least one sheet having longitudinal textile cords extending over the whole length of the device, the said longitudinal cords being parallel to said axis and mutually separated by a predetermined distance, the said helical cords and the said longitudinal cords being embedded in said elastomeric material and bonded thereto.

2. A device according to claim 1, wherein the said spacing of the cords in said sheets is substantially constant.

3. A device according to claim 1, wherein said sheets are composed of cords of aramid fibers treated by rolling or coating with a bonding substance.

4. A device according to claim 3, wherein the aramid fibers cords are made of three yarns twisted together, each yarn having a linear mass of 3300 dtex.

5. A device according to claim 1, wherein the said angle of the cords is different in the end zones of the tubular element from that in the middle zone of said tubular element.

6. A device according to claim 5, wherein the initial laying angle of the cords is of the order of 10°–12° in the middle zone, where the tubular element has to expand by up to three times its initial diameter, and is 20° in the end zones of said tubular element.

7. A device according to claim 1, wherein the ends of the tubular element near the end pieces are covered by sleeves adapted to limit the stress in the ends of the tubular element during inflation, the sleeve on one end of the tubular element being connected to the sleeve of the other end of the tubular element by longitudinal ties.

8. A device according to claim 1, wherein the ends of the tubular element comprise windings of a radially deformable fabric.

* * * * *